US012614423B2

(12) United States Patent
Mun

(10) Patent No.: US 12,614,423 B2
(45) Date of Patent: Apr. 28, 2026

(54) SMART KEY AND METHOD OF MANUFACTURING THEREOF

(71) Applicant: Continental Automotive Technologies GmbH, Hannover (DE)

(72) Inventor: JaeHo Mun, Gunpo-si (KR)

(73) Assignee: AUMOVIO Germany GmbH, Frankfurt am Main (DE)

( * ) Notice: Subject to any disclaimer, the term of this patent is extended or adjusted under 35 U.S.C. 154(b) by 0 days.

(21) Appl. No.: 18/569,958

(22) PCT Filed: Jun. 13, 2022

(86) PCT No.: PCT/EP2022/065991
§ 371 (c)(1),
(2) Date: Dec. 13, 2023

(87) PCT Pub. No.: WO2022/263358
PCT Pub. Date: Dec. 22, 2022

(65) Prior Publication Data

US 2024/0386765 A1 Nov. 21, 2024

(30) Foreign Application Priority Data

Jun. 17, 2021 (GB) ...................................... 2108644

(51) Int. Cl.
*G07C 9/00* (2020.01)

(52) U.S. Cl.
CPC .................... *G07C 9/00944* (2013.01); *G07C 2009/00952* (2013.01)

(58) Field of Classification Search
CPC . E05B 19/00; E05B 19/0082; G07C 9/00944; G07C 2009/00952

(Continued)

(56) References Cited

U.S. PATENT DOCUMENTS

| | | | | |
|---|---|---|---|---|
| 6,669,017 B2 * | 12/2003 | Linihan ................ | A44B 15/005 206/37.1 |
| 6,771,981 B1 * | 8/2004 | Zalewski ............ | H04M 17/026 455/575.1 |
| 6,948,614 B1 * | 9/2005 | Hall ..................... | A45C 11/329 206/38.1 |
| 7,657,226 B2 * | 2/2010 | Gisler ................ | G07C 9/00944 455/3.06 |

(Continued)

FOREIGN PATENT DOCUMENTS

| | | |
|---|---|---|
| CN | 1924263 A | 3/2007 |
| CN | 202345560 U | 7/2012 |

(Continued)

OTHER PUBLICATIONS

Elastomer—wikipedia (Year: 0000).*

(Continued)

*Primary Examiner* — Nathan Cumar

(57) ABSTRACT

Disclosed is a smart key in which an auxiliary key can be inserted and a method of manufacturing the smart key. The smart key for a vehicle comprises a substrate on which components are mounted; a key accommodation unit formed on the substrate, and a housing into which an auxiliary key is capable of being inserted and a plurality of protrusions arranged inside the housing such that the auxiliary key is sandwiched between the plurality of protrusions when the auxiliary key is inserted into the housing; and a case covering the substrate and the key accommodation unit, wherein the housing includes a through-hole configured such that a part of the housing adjacent to the through-hole is capable of flexibly displacing relative to the other parts of the housing to widen a vertical gap in the housing by an external force applied to the auxiliary key.

20 Claims, 10 Drawing Sheets

(58) Field of Classification Search
USPC ........................................................ 70/456 R
See application file for complete search history.

(56) References Cited

U.S. PATENT DOCUMENTS

| | | | | |
|---|---|---|---|---|
| 7,690,233 | B2 * | 4/2010 | Katagiri | G07C 9/00944 70/459 |
| 2006/0145810 | A1 * | 7/2006 | Buccinna | E05B 19/04 340/5.72 |
| 2007/0044525 | A1 * | 3/2007 | Katagiri | E05B 19/04 340/5.67 |
| 2011/0084856 | A1 * | 4/2011 | Kleindienst | E05B 19/043 340/988 |
| 2013/0039024 | A1 * | 2/2013 | Sugimoto | E05B 19/0082 361/757 |
| 2016/0250996 | A1 * | 9/2016 | Park | E05B 19/00 701/2 |
| 2019/0225187 | A1 * | 7/2019 | Saito | E05B 19/0052 |

FOREIGN PATENT DOCUMENTS

| | | | | |
|---|---|---|---|---|
| CN | 204095336 | U | | 1/2015 |
| CN | 206049524 | U | | 3/2017 |
| CN | 111480184 | A | | 7/2020 |
| JP | 2001238784 | A | | 9/2001 |
| JP | 2008031688 | A | | 2/2008 |
| JP | 2012046931 | A | | 3/2012 |
| JP | 2017218791 | A | | 12/2017 |
| KR | 20130018152 | A | | 2/2013 |
| KR | 101339311 | B1 | | 12/2013 |
| KR | 20150031894 | A | * | 3/2015 |
| KR | 20160148946 | A | | 12/2016 |
| KR | 20190102388 | A | * | 9/2019 |
| KR | 102042029 | B1 | | 11/2019 |

OTHER PUBLICATIONS

Search Report dated Apr. 7, 2022 from corresponding GB patent application No. 2108644.2.

International Search Report and Written Opinion dated Aug. 25, 2022 from corresponding International patent application No. PCT/EP2022/065991.

First Search issued on Dec. 12, 2025 from corresponding Chinese patent application No. 202280040685.5.

First Office Action issued on Dec. 12, 2025 from corresponding Chinese patent application No. 202280040685.5.

* cited by examiner

SMART KEY AND METHOD OF MANUFACTURING THEREOF

TECHNICAL FIELD

The present invention relates to a smart key for a vehicle and a method of manufacturing the smart key, and particularly relates to a smart key in which an auxiliary key can be inserted and a method of manufacturing the smart key.

BACKGROUND

The following discussion of the background is intended to facilitate an understanding of the present invention only. It may be appreciated that the discussion is not an acknowledgement or admission that any of the material referred to was published, known or part of the common general knowledge of the person skilled in the art in any jurisdiction as at the priority date of the present invention.

A smart key is an electronic access and authorization system which eliminates a need to insert a key blade in a keyhole of a vehicle when a user wishes to lock, unlock and/or start the vehicle. The smart key may be identified via an antenna in the vehicle. Once the smart key is identified, the vehicle may automatically be locked, unlocked or started.

Typically, a traditional metal key as an auxiliary key which may be used as a fall-back in case the smart key does not work is provided with the smart key. Conventionally, the smart key includes a housing into which the auxiliary key is inserted. The smart key further provides protrusions arranged in the inner surface of the housing to fix the auxiliary key in the housing. The user can remove the auxiliary key from the housing of the smart key, when the user wishes to use the auxiliary key.

However, in the event that the auxiliary key is too thick, the auxiliary key may press the protrusions heavily, and thus it may be hard for the user to remove the auxiliary key from the housing of the smart key. If the protrusions are designed to be thinner to avoid such situations, the auxiliary key may move in the housing, since the protrusions may not sufficiently fix the auxiliary key in the housing. Thus, rattle noise may be caused by the movement of the auxiliary key in the housing.

In light of the above, there exists a need to provide a solution that meets the mentioned needs at least in part.

SUMMARY

Throughout the specification, unless the context requires otherwise, the word “comprise” or variations such as “comprises” or “comprising”, will be understood to imply the inclusion of a stated integer or group of integers but not the exclusion of any other integer or group of integers.

Furthermore, throughout the specification, unless the context requires otherwise, the word “include” or variations such as “includes” or “including”, will be understood to imply the inclusion of a stated integer or group of integers but not the exclusion of any other integer or group of integers.

The present invention seeks to provide a smart key and a method of manufacturing the smart key that addresses the aforementioned need at least in part.

The technical solution is provided in the form of a smart key for a vehicle. The smart key includes a substrate on which components are mounted, a key accommodation unit formed on the substrate and including a housing into which an auxiliary key is capable of being inserted and a plurality of protrusions arranged inside the housing such that the auxiliary key is sandwiched between the plurality of protrusions when the auxiliary key is inserted into the housing; and a case covering the substrate and the key accommodation unit. The housing includes a through-hole configured such that a part of the housing adjacent to the through-hole is capable of flexibly displacing relative to the other parts of the housing to widen a vertical gap in the housing by an external force applied to the auxiliary key.

Therefore, the smart key and the method of manufacturing the smart key in accordance with the present invention can provide flexibility of the housing, so as to easily remove the auxiliary key from the housing by the external force of the user. Thus, the user can easily remove the auxiliary key from the widened gap of the housing, when the user wishes to do so. In addition, whilst the user can easily remove the auxiliary key from the housing, the smart key and the method of manufacturing the smart key in accordance with the present invention can fix the auxiliary key not to move in the housing by sandwiching the auxiliary key between the protrusions. Thus, rattle noise which can be caused by movement of the auxiliary key in the housing may be reduced or eliminated.

In accordance with an aspect of the present invention, there is a smart key for a vehicle comprising: a substrate on which components are mounted; a key accommodation unit formed on the substrate, and including a housing into which an auxiliary key is capable of being inserted and a plurality of protrusions arranged inside the housing such that the auxiliary key is sandwiched between the plurality of protrusions when the auxiliary key is inserted into the housing; and a case covering the substrate and the key accommodation unit, characterised in that: the housing includes a through-hole configured such that a part of the housing adjacent to the through-hole is capable of flexibly displacing relative to the other parts of the housing to widen a vertical gap in the housing by an external force applied to the auxiliary key.

In some embodiments, the key accommodation unit further includes an entrance allowing the auxiliary key to be inserted into the housing.

In some embodiments, the through-hole has a plurality of edges.

In some embodiments, the through-hole is arranged at a left side surface of the housing.

In some embodiments, the through-hole is rectangular in shape.

In some embodiments, the plurality of protrusions includes a first protrusion arranged at a top surface of the housing and a second protrusion arranged at a base surface of the housing.

In some embodiments, the first protrusion and the second protrusion are arranged adjacent to the through-hole.

In some embodiments, the second protrusion is extended towards the entrance.

In some embodiments, the key accommodation unit further includes a third protrusion arranged on the same surface as the second protrusion.

In some embodiments, the third protrusion is extended towards the entrance.

In some embodiments, the through-hole is arranged at a top surface of the housing.

In some embodiments, the through-hole has an inverted U shape.

In some embodiments, the plurality of protrusions includes a first protrusion arranged at a top surface of the housing, and a second protrusion and a third protrusion arranged at a base surface of the housing.

In some embodiments, the protrusions are made of the same material as the housing.

In some embodiments, the protrusions are made of at least one elastomer.

In some embodiments, the elastomer comprises or consists of any one of the following: natural rubber, silicone rubber, styrene-butadiene block copolymers, polyisoprene, polybutadiene, ethylene propylene rubber, ethylene propylene diene rubber, fluoroelastomers, polyurethane elastomers, and ethylene-vinyl acetate.

In accordance with another aspect of the present invention, there is a method of manufacturing a smart key for a vehicle comprising steps of: mounting components on a substrate; forming a key accommodation unit including a housing into which an auxiliary key is capable of being inserted on the substrate and a plurality of protrusions arranged inside the housing such that the auxiliary key is sandwiched between the plurality of protrusions when the auxiliary key is inserted into the housing; and covering the substrate and the key accommodation unit by a case, characterised in that: the method further includes a step of making a through-hole in the housing, wherein the through-hole is configured such that a part of the housing adjacent to the through-hole is capable of flexibly displacing relative to the other part of the housing to widen a vertical gap in the housing by an external force applied to the auxiliary key.

In some embodiments, the method further includes a step of making an entrance allowing the auxiliary key to be inserted into the housing.

In some embodiments, the through-hole has a plurality of edges.

In some embodiments, the through-hole is arranged at a left side surface of the housing.

In some embodiments, the through-hole is rectangular in shape.

In some embodiments, the plurality of protrusions includes a first protrusion arranged at a top surface of the housing and a second protrusion arranged at a base surface of the housing.

In some embodiments, the first protrusion and the second protrusion are arranged adjacent to the through-hole.

In some embodiments, the second protrusion is extended towards the entrance.

In some embodiments, the key accommodation unit further includes a third protrusion arranged on the same surface as the second protrusion.

In some embodiments, the third protrusion is extended towards the entrance.

In some embodiments, the through-hole is arranged at a top surface of the housing.

In some embodiments, the through-hole has an inverted U shape.

In some embodiments, the plurality of protrusions includes a first protrusion arranged at a top surface of the housing, and a second protrusion and a third protrusion arranged at a base surface of the housing.

In some embodiments, the protrusions are made of the same material as the housing.

In some embodiments, the protrusions are made of at least one elastomer.

In some embodiments, the elastomer comprises or consists of any one of the following: natural rubber, silicone rubber, styrene-butadiene block copolymers, polyisoprene, polybutadiene, ethylene propylene rubber, ethylene propylene diene rubber, fluoroelastomers, polyurethane elastomers, and ethylene-vinyl acetate.

Other aspects of the invention will become apparent to those of ordinary skilled in the art upon review of the following description of specific embodiments of the present invention in conjunction with the accompanying drawings.

BRIEF DESCRIPTION OF DRAWINGS

The present invention will now be described, by way of example only, with reference to the accompanying drawings, in which.

Other arrangements of the present invention are possible and, consequently, the accompanying drawings are not to be understood as superseding the generality of the preceding description of the invention.

DETAILED DESCRIPTION OF EMBODIMENT

Figure 1:
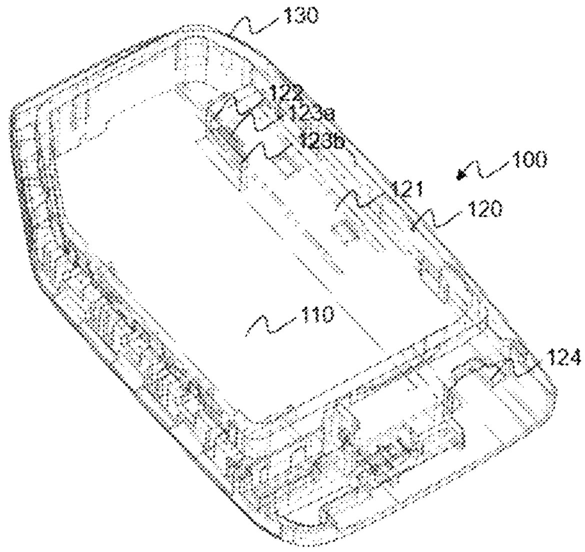
FIG. 1 is a perspective view of a smart key in accordance with an embodiment of the present invention.
Figure 2:
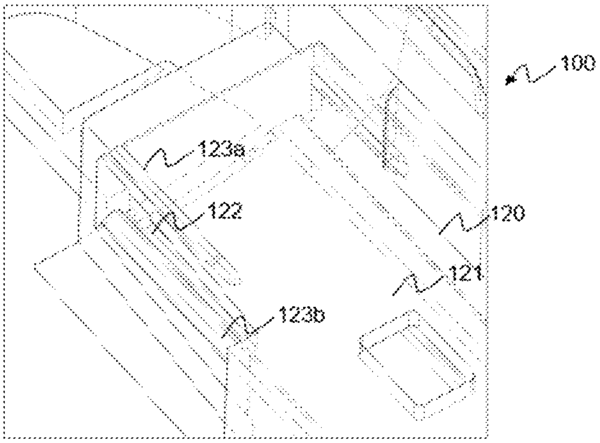
FIG. 2 is an enlarged perspective view of a smart key in accordance with an embodiment of the present invention.

FIG. 1 is a perspective view of a smart key 100 in accordance with an embodiment of the present invention. FIG. 2 is an enlarged perspective view of the smart key 100 in accordance with an embodiment of the present invention.

As shown in FIG. 1, the smart key 100 in accordance with an embodiment of the present invention comprises a substrate 110, a key accommodation unit 120 and a case 130.

The smart key 100 is an electronic access and authorization system which eliminates a need to insert a key blade in a keyhole of a vehicle when a user wishes to lock, unlock and/or start the vehicle. The smart key 100 may be identified via an antenna in the vehicle. Once the smart key 100 is identified, the vehicle may automatically be locked, unlocked or started.

The smart key 100 may be in the form of a fob or a card type key. It may be appreciated that the smart key 100 may be in any other forms.

The smart key 100 provides a metal key, as an auxiliary key 140 which may be used as a fall-back in case the smart key 100 does not work. The user can remove the auxiliary key 140 from the smart key 100 by pulling the auxiliary key 140 when the user wishes to use the auxiliary key 140.

One or more components are mounted on the substrate 110. One or more electric circuits may be formed on the substrate 110 to transmit an electrical signal of the components.

The case 130 covers the substrate 110 and the key accommodation unit 120. For example, the case 130 is made of a synthetic resin. The substrate 110 on which the components, the substrate 110 and the key accommodation unit

120 are mounted may be inserted into a mould and a synthetic resin liquid may be hardened around the substrate 110 in the mould to form the case 130.

The key accommodation unit 120 is formed on the substrate 110. The key accommodation unit 120 may have a space such that the auxiliary key 140 is inserted. For example, the key accommodation unit 120 may be coupled to a lower end and a right end of the substrate 110. It may be appreciated that a groove may be formed in a shape corresponding to the key accommodation unit 120 on the substrate 110. The key accommodation unit 120 may be inserted into the groove of the substrate 110 and fixed. An elongated groove may be formed on the substrate 110, and the elongated key accommodation unit 120 may be installed in the groove.

Although not shown, a battery accommodation unit may be formed on the substrate 110. The battery accommodation unit may be connected to the electric circuit. A battery may be inserted into the battery accommodation unit to supply power to the electric circuit formed on the substrate 110.

As shown in FIGS. 1 and 2, the key accommodation unit 120 includes a housing 121 into which the auxiliary key 140 is capable of being inserted. The key accommodation unit 120 further includes an entrance 124 allowing the auxiliary key 140 to be inserted into the housing 121. For example, the entrance 124 may be coupled to a front end of the substrate 110. The auxiliary key 140 may be inserted into the housing 121 through the entrance 124 in a sliding manner.

In some embodiments, the housing 121 may be coupled to the lower end and the right end of the substrate 110. It may be appreciated that the housing 121 may be formed in a shape corresponding to the groove on the substrate 110.

The housing 121 includes a through-hole 122. The through-hole 122 is configured such that a part of the housing 121 adjacent to the through-hole 122 is capable of flexibly displacing relative to the other parts of the housing 121 to widen a vertical gap in the housing 121 by an external force applied to the auxiliary key 140.

For example, the through-hole 122 is configured to expose a part of the auxiliary key 140. The through-hole 122 may have a plurality of edges. For example, as shown in FIGS. 1 and 2, the through-hole 122 has four (4) edges.

In some embodiments, the through-hole 122 is arranged at a left side surface of the housing. As shown in FIGS. 1 and 2, the through-hole 122 may be rectangular in shape. It may be appreciated that the shape of through-hole 122 may also include any polygon such as square and hexagon.

For example, the through-hole 122 is configured to expose the part of the auxiliary key 140 adjacent to a tip of the auxiliary key 140, such that the part of the housing 121 adjacent to the through-hole 122 and the tip of the auxiliary key 140 is capable of flexibly displacing relative to the other parts of the housing 121 to widen a vertical gap in the housing 121 by an external force for removing the auxiliary key 140 from the housing 121.

In some embodiments, a height of the through-hole 122 may be the same as a height of the housing 121. In some other embodiments, the height of the through-hole 122 may be shorter than the height of the housing 121.

The key accommodation unit 120 further includes a plurality of protrusions 123 arranged inside the housing 121, such that the auxiliary key 140 is sandwiched between the plurality of protrusions 123 when the auxiliary key 140 is inserted into the housing 121.

As shown in FIGS. 1 and 2, the protrusions 123 include a first protrusion 123*a* arranged at an upper surface of the housing 121. The protrusions 123 further include a second protrusion 123*b* arranged at a base surface of the housing 121. For example, the first protrusion 123*a* and the second protrusion 123*b* are arranged adjacent to the through-hole 122.

In some embodiments, as shown in FIGS. 1 and 2, the first protrusion 123*a* has a length corresponding to the width of the through-hole 122, and the second protrusion 123*b* is extended beyond the through-hole 122, towards the entrance 124.

Although not shown, in some other embodiments, the first protrusion 123*a* may be extended beyond the through-hole 122, towards the entrance 124. Although not shown, in some other embodiments, the second protrusion 123*b* may have a length corresponding to the width of the through-hole 122.

In some embodiments, the protrusions 123 are made of the same material as the housing 121. For example, the housing 121 with the protrusions 123 may be inserted into a mould and a synthetic resin liquid may be hardened to form the housing 121 and the protrusions 123.

In some embodiments, the protrusions 123 are made of a rigid material. The rigid material comprises or consists of plastic such as polypropylene, polycarbonate, high-density polyethylene, low-density polyethylene, and polyethylene terephthalate.

In some other embodiments, the protrusions 123 are made of at least one elastic material. The elastic material may include at least one elastomer. The elastomer comprises or consists of any one of the following: natural rubber, silicone rubber, styrene-butadiene block copolymers, polyisoprene, polybutadiene, ethylene propylene rubber, ethylene propylene diene rubber, fluoroelastomers, polyurethane elastomers, and ethylene-vinyl acetate.

Advantageously, the use of the elastic material for the protrusions 123 may provide more flexibility to remove the auxiliary key 140 from the housing 121, while fixing the auxiliary key 140 not to move in the housing 121 by sandwiching the auxiliary key 140 between the protrusions 123.

In some embodiments, the plurality of protrusions 123 are made of the same elastomer.

In some other embodiments, the plurality of protrusions 123 are made of different elastomer to provide different elastic forces. For example, the first protrusion 123*a* which is arranged at the top surface of the housing 121 may be made of a first elastomer, and the second protrusion 123*b* which is arranged at the base surface of the housing 121 may be made of a second elastomer different from the first elastomer.

In some other embodiments, the plurality of protrusions 123 are made of the same material as the housing 121, and then are covered by the at least one elastic element.

Figure 3:
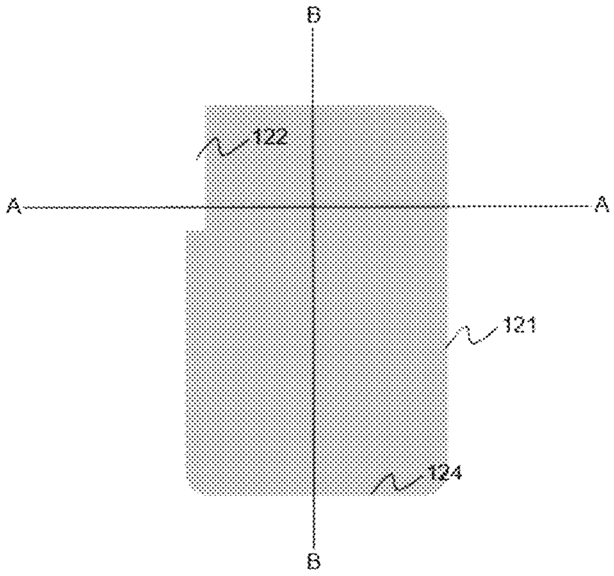
FIG. 3 is a planar view of a key accommodation unit of a smart key in accordance with an embodiment of the present invention.
Figure 4:
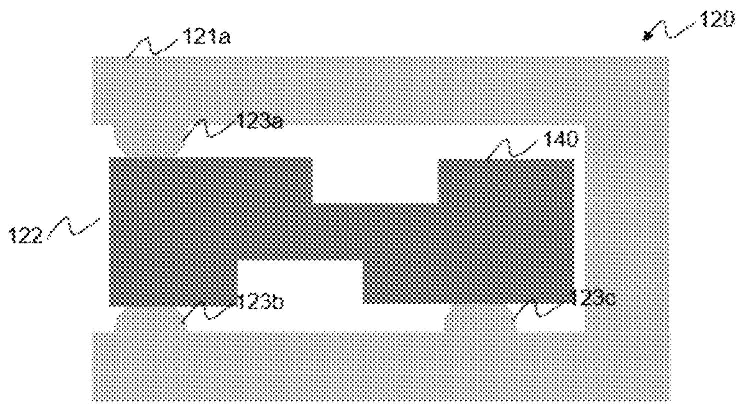
FIGS. 4 and 5 are section views for section A-A of a key accommodation unit of a smart key shown in FIG. 3.
Figure 5:
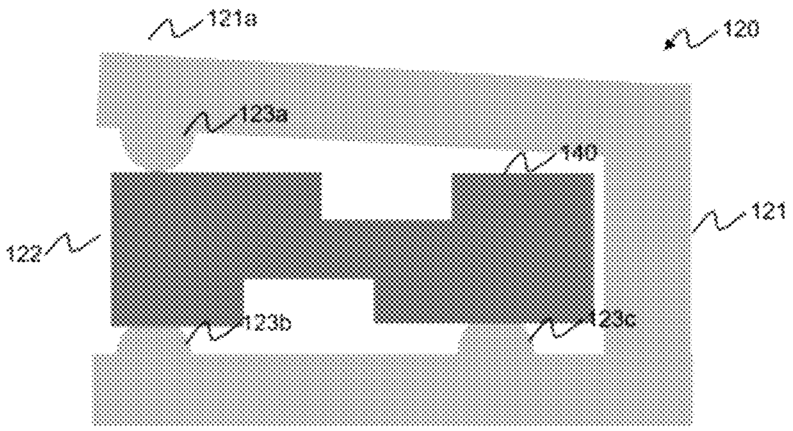
Figure 6:
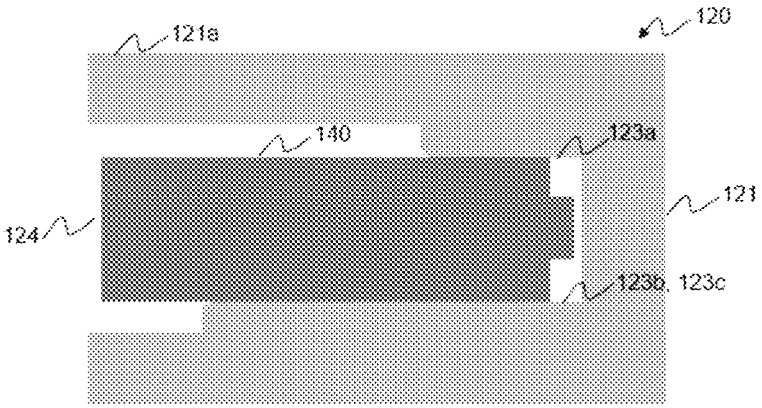
FIG. 6 is a section view for section B-B of a key accommodation unit of a smart key shown in FIG. 3.

FIG. 3 is a planar view of a key accommodation unit 120 of a smart key 100 in accordance with an embodiment of the present invention. FIGS. 4 and 5 are section views for section A-A of a key accommodation unit 120 of a smart key 100 shown in FIG. 3. FIG. 6 is a section view for section B-B of a key accommodation unit 120 of a smart key 100 shown in FIG. 3.

As shown in FIGS. 4 to 6, the key accommodation unit 120 includes the housing 121 into which the auxiliary key 140 can be inserted. The auxiliary key 140 can be inserted into the housing 121 through the entrance 124 formed on the smart key 100.

As shown in FIGS. 4 to 6, the key accommodation unit 120 further includes a plurality of protrusions 123, such that the auxiliary key 140 is sandwiched between the plurality of protrusions 123 when the auxiliary key 140 is inserted into the housing 121.

The plurality of protrusions 123 includes the first protrusion 123*a* arranged at the top surface of the housing 121 and the second protrusion 123*b* arranged at the base surface of the housing 121. The auxiliary key 140 may be sandwiched between the first protrusion 123*a* and the second protrusion 123*b*, when the auxiliary key 140 is inserted into the housing 121.

As shown in FIGS. 4 to 6, the key accommodation unit 120 may further include one or more additional protrusions, for example a third protrusion 123*c*. The third protrusion 123*c* may be arranged on the same surface as the second protrusion 123*b*, such that the auxiliary key 140 is sandwiched between the first protrusion 123*a*, the second protrusion 123*b* and the third protrusion 123*c*, when the auxiliary key 140 is inserted into the housing 121. For example, as shown in FIG. 6, the third protrusion 123*c* is extended towards the entrance 124. Although not shown, as another example, the third protrusion 123*c* has a length corresponding to the width of the through-hole 122.

Although not shown, the key accommodation unit 120 may further include one or more additional protrusions, for example a fourth protrusion 123*d*. The fourth protrusion 123*d* may be arranged on the same surface as the first protrusion 123*a*, such that the auxiliary key 140 is sandwiched between the first protrusion 123*a*, the second protrusion 123*b* and the fourth protrusion 123*d*, when the auxiliary key 140 is inserted into the housing 121. For example, the fourth protrusion 123*d* is extended towards the entrance. As another example, the fourth protrusion 123*d* has a length corresponding to the width of the through-hole 122.

The housing 121 includes the through-hole 122. As shown in FIGS. 3 to 5, the through-hole 122 may be arranged at the left side surface of the housing 121. The through-hole 122 is configured such that the part of the housing 121 adjacent to the through-hole 122 is can flexibly displace relative to the other parts of the housing 121 to widen the vertical gap in the housing 121 by the external force applied to the auxiliary key 140.

As shown in FIGS. 4 and 5, once the user pulls the auxiliary key 140 to remove the auxiliary key 140 from the smart key 100, the part of the housing 121, for example upper part of the housing 121*a*, may displace relative to the other parts of the housing 121. This may lead the vertical gap in the housing 121 may be widened. Therefore, the user can easily remove the auxiliary key 140 from the widened gap of the housing 121 of the smart key 100.

Figure 7:
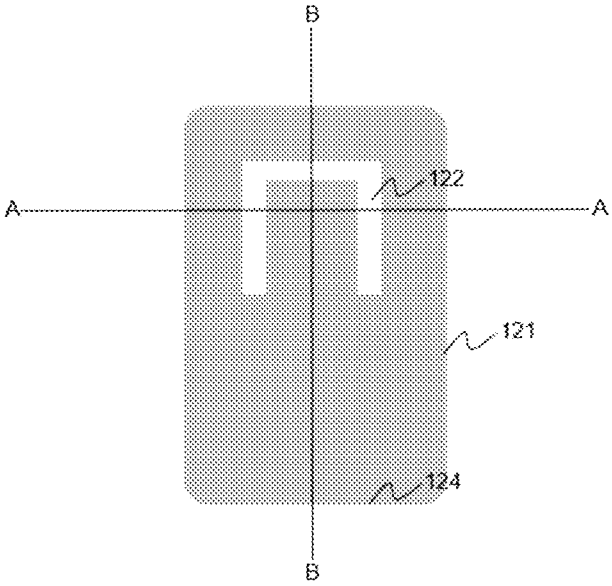
FIG. 7 is a planar view of a key accommodation unit of a smart key in accordance with another embodiment of the present invention.
Figure 8:
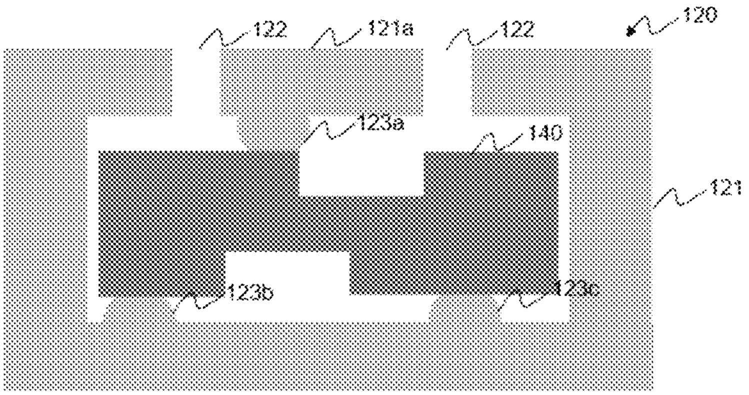
FIG. 8 is a section view for section A-A of a key accommodation unit of a smart key shown in FIG. 7.
Figure 9:
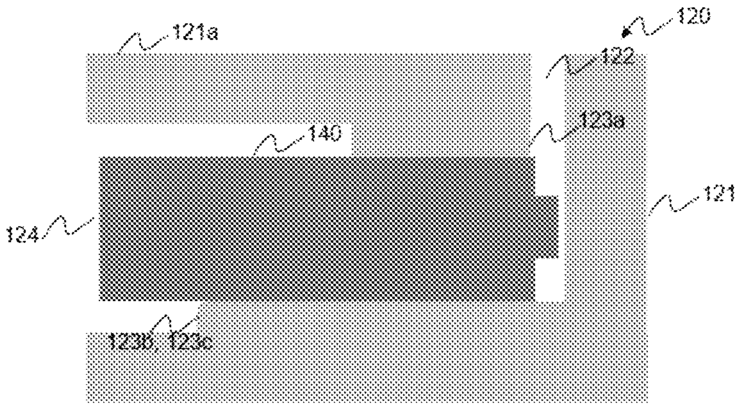
FIGS. 9 and 10 are section views for section B-B of a key accommodation unit of a smart key shown in FIG. 7.
Figure 10:
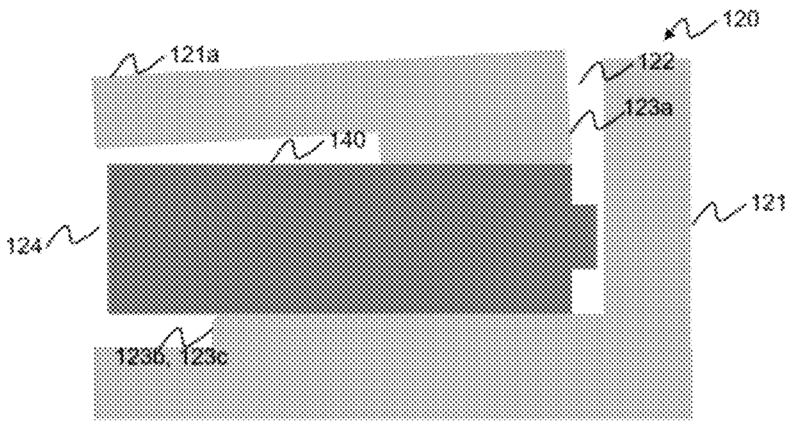

FIG. 7 is a planar view of a key accommodation unit 120 of a smart key 100 in accordance with another embodiment of the present invention. FIG. 8 is a section view for section A-A of a key accommodation unit 120 of a smart key 100 shown in FIG. 7. FIGS. 9 and 10 are section views for section B-B of a key accommodation unit 120 of a smart key 100 shown in FIG. 7

The housing 121 includes the through-hole 122. As shown in FIGS. 7 to 9, the through-hole 122 may be arranged at the top surface of the housing 121. The through-hole 122 is configured such that the part of the housing 121 adjacent to the through-hole 122 is can flexibly displace relative to the other parts of the housing 121 to widen the vertical gap in the housing 121 by the external force applied to the auxiliary key 140.

It may be appreciated that the shape of through-hole 122 may include any polygon. For example, as shown in FIGS. 7 and 8, the through-hole 122 may have an inverted U shape.

As shown in FIGS. 9 and 10, once the user pulls the auxiliary key 140 to remove the auxiliary key 140 from the smart key 100, the part of the housing 121, for example a portion of the upper part of the housing 121*a*, may displace relative to the other parts of the housing 121. The portion of the upper part of the housing 121*a* may include an inner central area surrounded by the inverted U shaped through hole 122. This may lead the vertical gap in the housing 121 may be widened. Therefore, the user can easily remove the auxiliary key 140 from the widened gap of the housing 121 of the smart key 100.

Since the smart key 100 in accordance with some embodiments of the present invention includes the through-hole 122 allowing the part of the housing 121 to be displaced relative to the other parts of the housing 121, the user can easily remove the auxiliary key 140 from the widened gap of the housing 121 of the smart key 100 even when the auxiliary key 140 is thick.

In addition, while the user can easily remove the auxiliary key 140 from the smart key 100, the key accommodation unit 120 of the smart key 100 can fix the auxiliary key 140 not to move in the housing 121 by sandwiching the auxiliary key 140 between the protrusions 123. Thus, rattle noise which can be caused by movement of the auxiliary key 140 in the housing 121 may be reduced or eliminated.

As such, the smart key 100 in accordance with some embodiments of the present invention can improve the assembly of the auxiliary key 140 into the smart key 100 regardless of the thickness of the auxiliary key 140, without mounting additional components.

While the present invention has been particularly shown and described with reference to exemplary embodiments thereof, it will be understood by those skilled in the art that various changes in form and details may be made therein without departing from the spirit and scope of the present invention as defined by the appended claims. However, this is merely an exemplarily embodiment, and those skilled in the art will recognize that various modifications and equivalents are possible in light of the above embodiments.

| LIST OF REFERENCE SIGNS | |
|---|---|
| 100: Smart key | 110: Substrate |
| 120: Key accommodation unit | 121: Housing |
| 122: Through-hole | 123: Protrusion |
| 123a: First protrusion | 123b: Second protrusion |
| 123c: Third protrusion | 123d: Fourth protrusion |
| 124: Entrance | 130: Cover |
| 140: Auxiliary key | |

The invention claimed is:

1. A smart key for a vehicle comprising:

a substrate on which components are mounted;

a key accommodation unit formed on the substrate, including a housing into which an auxiliary key is capable of being inserted and a plurality of protrusions arranged inside the housing such that the auxiliary key is sandwiched between the plurality of protrusions when the auxiliary key is inserted into the housing; and a case covering the substrate and the key accommodation unit;

wherein the housing includes a through-hole configured such that a part of the housing adjacent to the through-hole is capable of flexibly displacing relative to the other parts of the housing to widen a vertical gap in the housing by an external force applied to the auxiliary key.

2. The smart key according to claim 1, wherein the key accommodation unit further includes an entrance allowing the auxiliary key to be inserted into the housing.

3. The smart key according to claim 1, wherein the through-hole has a plurality of edges.

4. The smart key according to claim 2, wherein the through-hole is arranged at a side surface of the housing.

5. The smart key according to claim 4, wherein the through-hole is rectangular in shape.

6. The smart key according to claim 4, wherein the plurality of protrusions includes a first protrusion arranged at a top surface of the housing and a second protrusion arranged at a base surface of the housing.

7. The smart key according to claim 6, wherein the first protrusion and the second protrusion are arranged adjacent to the through-hole.

8. The smart key according to claim 6, wherein the second protrusion is extended towards the entrance.

9. The smart key according to claim 6, wherein the key accommodation unit further includes a third protrusion arranged on the same surface as the second protrusion.

10. The smart key according to claim 9, wherein the third protrusion is extended towards the entrance.

11. The smart key according to claim 2, wherein the through-hole is arranged at a top surface of the housing.

12. The smart key according to claim 11, wherein the through-hole has an inverted U shape.

13. The smart key according to claim 11, wherein the plurality of protrusions includes a first protrusion arranged at a top surface of the housing, and a second protrusion and a third protrusion arranged at a base surface of the housing.

14. The smart key according to claim 1, wherein the protrusions are made of the same material as the housing.

15. The smart key according to claim 1, wherein the protrusions are made of at least one elastomer.

16. The smart key according to claim 15, wherein the elastomer comprises or consists of any one of following: natural rubber, silicone rubber, styrene-butadiene block copolymers, polyisoprene, polybutadiene, ethylene propylene rubber, ethylene propylene diene rubber, fluoroelastomers, polyurethane elastomers, and ethylene-vinyl acetate.

17. A method of manufacturing a smart key for a vehicle comprising steps of:

mounting components on a substrate;

forming a key accommodation unit including a housing into which an auxiliary key is capable of being inserted on the substrate and a plurality of protrusions arranged inside the housing such that the auxiliary key is sandwiched between the plurality of protrusions when the auxiliary key is inserted into the housing;

covering the substrate and the key accommodation unit by a case and;

making a through-hole in the housing, wherein the through-hole is configured such that a part of the housing adjacent to the through-hole is capable of flexibly displacing relative to the other parts of the housing to widen a vertical gap in the housing by an external force applied to the auxiliary key.

18. The smart key according to claim 2, wherein the through-hole has a plurality of edges.

19. The smart key according to claim 3, wherein the through-hole is arranged at a side surface of the housing.

20. The smart key according to claim 19, wherein the through-hole is rectangular in shape.

* * * * *